US012099627B2

(12) United States Patent
Shaik (10) Patent No.: US 12,099,627 B2
(45) Date of Patent: Sep. 24, 2024

(54) SECURE COMPLIANT STORAGE OF SERVER ACCESS DATA

(71) Applicant: FMR LLC, Boston, MA (US)

(72) Inventor: Bude Saheb Shaik, Cary, NC (US)

(73) Assignee: FMR LLC, Boston, MA (US)

( * ) Notice: Subject to any disclaimer, the term of this patent is extended or adjusted under 35 U.S.C. 154(b) by 319 days.

(21) Appl. No.: 17/397,886

(22) Filed: Aug. 9, 2021

(65) Prior Publication Data

US 2023/0045034 A1   Feb. 9, 2023

(51) Int. Cl.
*G06F 21/62* (2013.01)
*G06F 9/48* (2006.01)
*G06F 16/17* (2019.01)
*G06F 16/176* (2019.01)
*G06F 21/60* (2013.01)

(52) U.S. Cl.
CPC ........ *G06F 21/6245* (2013.01); *G06F 9/4887* (2013.01); *G06F 16/1734* (2019.01); *G06F 16/1774* (2019.01); *G06F 21/602* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 9,424,432 B2 | 8/2016 | Holland et al. | |
| 10,482,269 B1 | 11/2019 | Carroll et al. | |
| 10,838,828 B2 | 11/2020 | Bourgeois et al. | |
| 2007/0250547 A1* | 10/2007 | Kai | G06F 21/552 |
| 2009/0049086 A1* | 2/2009 | Hsu | G06F 21/805 |
| 2013/0311736 A1* | 11/2013 | Winokur | G06F 11/2082 |
| | | | 711/162 |
| 2016/0026819 A1* | 1/2016 | Malik | G06F 21/6218 |
| | | | 726/1 |
| 2019/0103978 A1* | 4/2019 | Chen | H04L 9/3247 |
| 2020/0174671 A1 | 6/2020 | Margaglia et al. | |
| 2020/0342127 A1* | 10/2020 | Mullin | G06F 21/6254 |
| 2021/0141698 A1* | 5/2021 | Bourgeois | G06F 16/353 |
| 2022/0398337 A1* | 12/2022 | Franquin | G06F 16/215 |

FOREIGN PATENT DOCUMENTS

KR   20200077935   *  7/2020  ......... G06F 21/6245

* cited by examiner

*Primary Examiner* — Benjamin E Lanier
*Assistant Examiner* — Felicia Farrow
(74) *Attorney, Agent, or Firm* — Cesari & McKenna, LLP (57) ABSTRACT

Methods and apparatuses are described for secure compliant storage of server access data. A server computing device generates one or more access logs based upon data access requests executed on a first compliant data storage container comprising a plurality of files. The server computing device stores the one or more access logs in a non-compliant data storage container and establishes a second compliant data storage container. The server computing device retrieves, from the non-compliant data storage container, the access logs stored therein and stores the access logs in the second compliant data storage container.

24 Claims, 4 Drawing Sheets

SECURE COMPLIANT STORAGE OF SERVER ACCESS DATA

TECHNICAL FIELD

This application relates generally to methods and apparatuses, including computer program products, for secure compliant storage of server access data.

BACKGROUND

With the advent of highly-flexible and secure cloud-based data storage solutions, many organizations are transitioning away from legacy enterprise content management repositories such as Documentum™. However, many of these organizations—including financial and healthcare organizations—are subject to stringent legal and regulatory requirements regarding the preservation, retention, and security of their policies and procedures. Failure to comply with these legal and regulatory requirements can lead to significant fines and other disciplinary action.

Therefore, such organizations typically utilize Write Once Read Many (WORM)-compliant storage solutions in their enterprise content management systems. Generally, WORM storage enables a file or document to be written only once to a storage area and not subsequently modified or deleted, but the file can be read any number of times. As a result, this configuration ensures that the file is preserved as originally created to satisfy the applicable retention requirements. In addition, encryption-based storage is also desirable to preserve the security and privacy of the files in accordance with certain regulations.

These types of regulatory requirements are not limited only to content files, but also to access logs and other metadata that relate to users' interaction with the content files. Access log data is important to maintain and preserve properly, so that accurate and detailed audits of such activity can be conducted in order to comply with legal and regulatory mandates.

Some cloud-based storage platforms offer partial solutions to these requirements, but fail at providing a complete, fully-compliant mechanism for storing access log data. For example, in a typical configuration, a cloud-based storage platform may provide for server-side access logging but does not allow the storage area (i.e. bucket, container, etc.) for the access logs to use an object lock, which would provide WORM-compliant storage. In addition, encryption on the container that stores the access logs is typically limited to AES256 encryption and does not allow for other types of encryption (e.g., key management services) to be used, which falls short of certain regulatory requirements.

SUMMARY

Therefore, what is needed are methods and systems for secure compliant storage of server access log data, so that access logs can be automatically and securely stored in a cloud-based architecture while also ensuring compliance with legal and regulatory requirements that call for WORM compliance and robust encryption. The techniques described herein beneficially provide for an automated mechanism for copying and storage of server access logs in a fully-compliant storage area while taking advantage of existing cloud platform file storage and management functionality.

The invention, in one aspect, features a system for secure compliant storage of server access data. The system includes a server computing device having a memory for storing computer-executable instructions and a processor that executes the computer-executable instructions. The server computing device generates one or more access logs based upon data access requests executed on a first compliant data storage container comprising a plurality of files. The server computing device stores the one or more access logs in a non-compliant data storage container. The server computing device establishes a second compliant data storage container. The server computing device retrieves, from the non-compliant data storage container, the access logs stored therein. The server computing device stores the access logs in the second compliant data storage container.

The invention, in another aspect, features a computerized method of secure compliant storage of server access data. A server computing device generates one or more access logs based upon data access requests executed on a first compliant data storage container comprising a plurality of files. The server computing device stores the one or more access logs in a non-compliant data storage container. The server computing device establishes a second compliant data storage container. The server computing device retrieves, from the non-compliant data storage container, the access logs stored therein. The server computing device stores the access logs in the second compliant data storage container.

Any of the above aspects can include one or more of the following features. In some embodiments, the first compliant data storage container and the second compliant data storage container each comprises a storage area configured for compliance with Write Once Read Many (WORM) storage requirements. In some embodiments, the first compliant data storage container and the second compliant data storage container have (i) an object lock enabled and (ii) key management service encryption enabled. In some embodiments, the non-compliant data storage container comprises a container without an object lock enabled and without key management service encryption enabled.

In some embodiments, the one or more access logs comprise attributes of requests to access one or more of the files stored in the first compliant data storage container. In some embodiments, the attributes of requests to access one or more of the files comprise a requester ID, a container name, a request time, a request action, a response status, and an error code. In some embodiments, the server computing device executes a Lambda function to retrieve the access logs from the non-compliant data storage container and store the access logs in the second compliant data storage container. In some embodiments, the server computing device automatically executes the Lambda function according to a predefined schedule. In some embodiments, the predefined schedule includes periodic events that, when triggered, cause the server computing device to execute the Lambda function. In some embodiments, each periodic event is configured according to one or more permissions that enable the server computing device to read the access logs from the non-compliant data storage container and write the access logs to the second compliant data storage container.

In some embodiments, establishing a second compliant data storage container comprises creating a new data storage container and configuring the new data storage container to match a data storage compliance configuration of the first compliant data storage container. In some embodiments, the data storage compliance configuration of the first compliant data storage container comprises (i) an object lock enabled and (ii) key management service encryption enabled. In some embodiments, the server computing device deletes the access logs from the non-compliant data storage container after storing the access logs in the second compliant data storage container.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
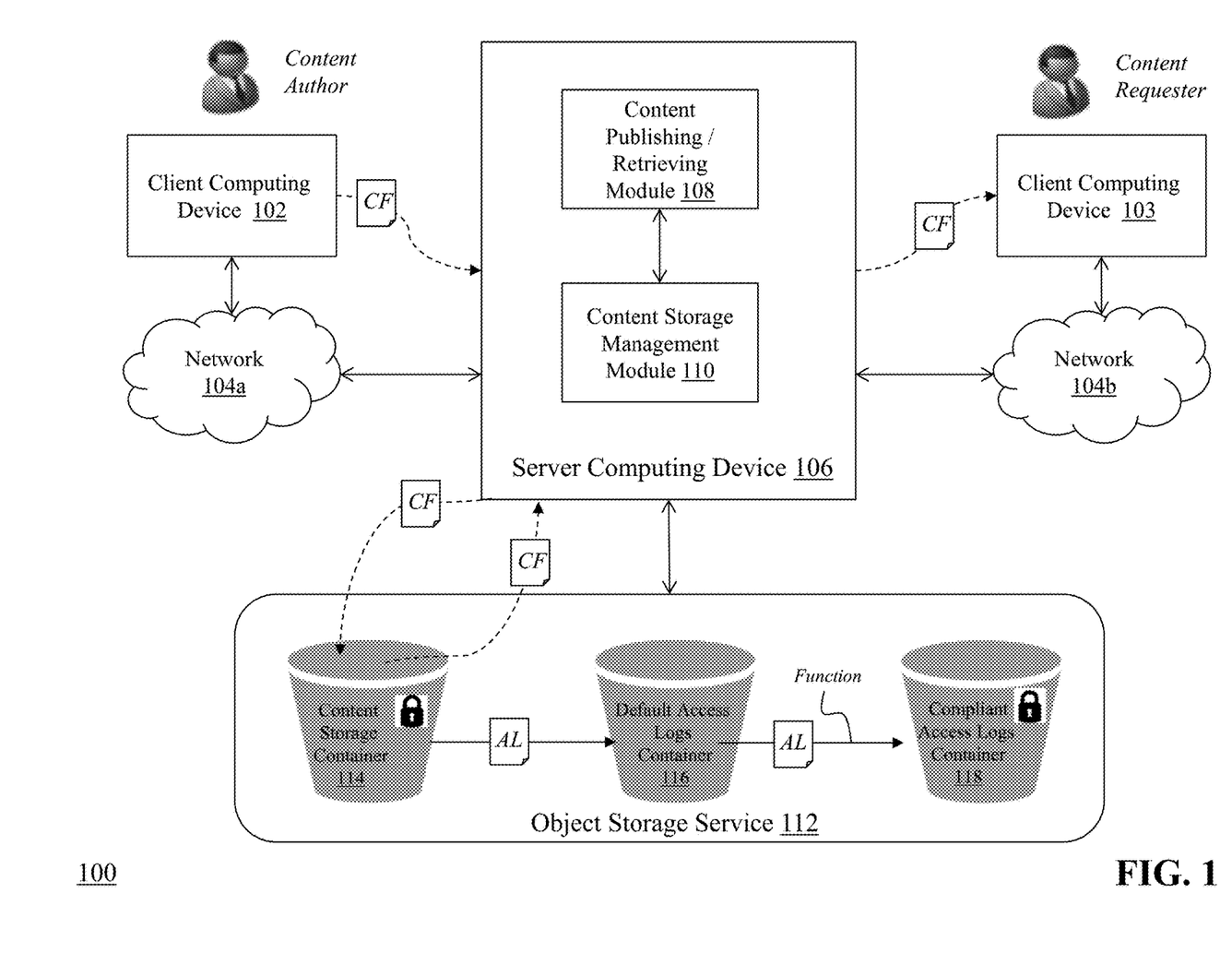
FIG. 1 is a block diagram of a system for secure compliant storage of server access data.

FIG. 1 is a block diagram of a system for secure compliant storage of server access data. The system 100 includes remote computing devices 102, 103, communications networks 104a, 104b, a server computing device 106 that includes a content publishing/retrieving module 108, a content storage management module 110, and an object storage service 112 that includes a content storage container 114, a default access logs container 116, and a compliant access logs container 118.

The remote computing devices 102, 103 connect to one or more communications networks (e.g., 104a, 104b respectively) in order to communicate with the server computing device 106 to provide input and receive output relating to secure compliant storage of server access data as described herein. Exemplary remote computing devices 102, 103 include but are not limited to desktop computers, laptop computers, tablets, mobile devices, smartphones, web application servers, cloud-based computing systems, database management platforms, software-as-a-service (SaaS) platforms, sysadmin control devices, and the like. It should be appreciated that other types of computing devices that are capable of connecting to the components of the system 100 can be used without departing from the scope of invention. Although FIG. 1 depicts two remote computing devices 102, 103, it should be appreciated that the system 100 can include any number of remote computing devices.

The communications networks 104a, 104b enable the respective remote computing devices 102, 103 to communicate with the server computing device 106. The networks 104a, 104b are typically wide area networks, such as the Internet and/or a cellular network. In some embodiments, the networks 104a, 104b are comprised of several discrete networks and/or sub-networks (e.g., cellular to Internet). In some embodiments, the networks 104a, 104b can be part of the same overall network topography and/or the remote computing devices 102, 103 can connect to the server computing device 106 using the same network.

The server computing device 106 is a device including specialized hardware and/or software modules that execute on a processor and interact with memory modules of the server computing device 106, to receive data from other components of the system 100, transmit data to other components of the system 100, and perform functions for secure compliant storage of server access data as described herein. The server computing device 106 includes a content publishing/retrieving module 108 and a content storage management module 110 that execute on the processor of the server computing device 106. In some embodiments, the modules 108, 110 are specialized sets of computer software instructions programmed onto one or more dedicated processors in the server computing device.

Although the modules 108, 110 are shown in FIG. 1 as executing within the same server computing device 106, in some embodiments the functionality of the modules 108, 110 can be distributed among one or a plurality of other computing devices that are coupled to the server computing device 106. As shown in FIG. 1, the server computing device 106 enables the modules 108, 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the modules 108, 110 will be described in greater detail throughout this specification.

The object storage service 112 is a cloud-based service (executing on a computing device or in some embodiments, a plurality of computing devices) coupled to the server computing device 106. The object storage service 112 is configured to receive, generate, and store specific segments of data relating to the process of secure compliant storage of server access data herein. In some embodiments, all or a portion of the object storage service 112 can be integrated with the server computing device 106 or be located on a separate computing device or devices. An exemplary implementation of the object storage service 112 is the Amazon Simple Storage Service (Amazon S3™) available from Amazon, Inc. As shown in FIG. 1, the object storage service 112 provides containers 114, 116, 118 for storage of certain types of data. In this context, a container is a type of storage area provided by the object storage service that enables users to store objects (i.e. files and any related metadata for the files). Users can create containers to store certain types of data, including content files (CFs) such as documents, code, images, videos, and the like. In addition, the object storage service 112 can utilize containers to store metadata relating to the content files themselves as well as metadata relating to access and usage of the object storage service 112. For example, the object storage service 112 can be configured to automatically generate access log (AL) data each time a user or a service accesses a particular container (e.g. content storage container 114), and to store the access log data in another container (e.g. default access logs container 116). Generally, access to a container can comprise transactions to insert, read, write, and/or delete objects in a container (although other types of access transactions can be contemplated). As can be appreciated, maintaining access log data can be useful for many different applications including system security, regulatory compliance, and auditing.

In some embodiments, each container is configured with an identifier (e.g. name) that uniquely identifies the container in a particular data storage area (also called a partition or region) of the data storage service 112. This avoids the creation of containers with the same identifier, which could cause data access and data integrity errors. To access a container, a user (e.g. at client computing device 102) can issue one or more commands, most often via application programming interface (API) and/or graphical user interface (GUI), that connect the client computing device to the container (e.g. via server computing device 106) and enable the user to perform actions on the objects in the container. It should be appreciated that this process can be configured according to specific data access permissions—for example, certain users/accounts/client devices may be able to perform different access functions on a particular container and/or particular objects based upon certain permissions afforded to the user/account/client device.

Furthermore, certain containers can be configured with data retention settings on all objects stored in the container and/or data retention settings on individual objects in the container. In some embodiments, the availability of data retention settings is especially important to ensure regulatory compliance. For example, an entity such as the Securities and Exchange Commission (SEC) or Financial Industry Regulatory Authority, Inc. (FINRA) may require companies that handle sensitive data (e.g. financial, healthcare) to store data using a Write Once, Read Many (WORM) model so that the data is retained for a prescribed period of time and so that the data remains unchanged during the retention period. Essentially, the WORM model allows information to be read as many times as needed, but prevents users from modifying or deleting the information once it is written to storage. In many cases, implementation of a WORM storage model relies upon date/timestamps assigned to the information when it is written to determine whether retention is still necessary or whether the information can be removed from storage. The container described above provides an object lock feature that enables WORM storage in certain containers. As can be appreciated, the object lock can comprise permissions placed on the container that prevents objects in the container from being deleted or changed.

In addition to WORM compliance, entities may require companies to store data using robust encryption techniques. To achieve this requirement, certain containers can be configured with encryption behavior applied to objects stored in the container. In one example, a container may be configured such that every time a new object is stored, the object is encrypted. The container can use either platform-managed keys or customer master keys (CMKs) stored in a key management service for encrypting objects, which are both server-side processes. As an alternative, users can opt to encrypt data with their own encryption scheme and then store the encrypted data in a container.

However, it should be appreciated that the above-referenced data retention requirements (SEC, FINRA) also generally apply to metadata that relates to the underlying content data that must be retained. Therefore, access log data is subject to the same retention requirements.

However, as noted previously, a current implementation of some cloud-based containers that store access logs does not allow for these access log containers (i.e. default access log container 116) to be configured with an object lock enabled. As a result, the default access log container 116 is not WORM-compliant. Furthermore, some cloud-based platforms do not support key management service encryption for access log containers, only default encryption. Therefore, these default access log containers do not meet current data retention requirements of SEC and FINRA regulations. To reflect this, as shown in FIG. 1, the content storage container 114 and the compliant access logs storage container 118 are configured with a WORM-compliant storage model and with key management service encryption enabled (as indicated by the lock symbol) while the default access logs container 116 is not configured with a WORM-compliant storage model or with key management service encryption (therefore, no lock symbol is present). Thus, companies that rely on certain types of cloud-based storage to store information that is subject to certain retention requirements do not have an out-of-the-box mechanism for ensuring the access log data is also stored in a compliant fashion.

Figure 2:
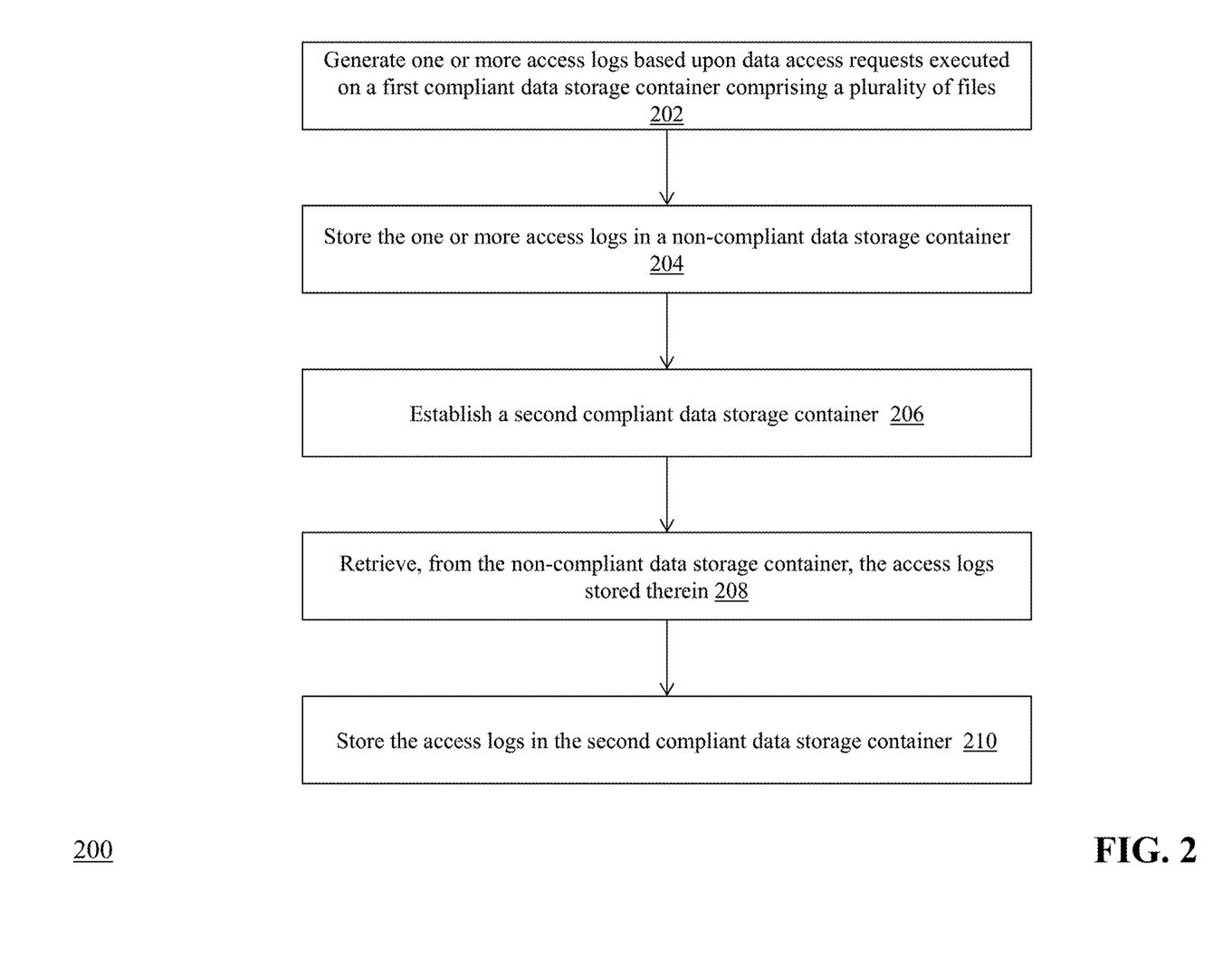
FIG. 2 is a flow diagram of a computerized method of secure compliant storage of server access data.

As mentioned above, to overcome this limitation the methods and systems described herein provide an advantageous way to store access log data in both a WORM-compliant and an encrypted fashion. FIG. 2 is a flow diagram of a computerized method 200 of secure compliant storage of server access data, using the system 100 of FIG. 1. A user (content author) at client computing device 102 generates a content file (CF) and transmits the content file to the server computing device 106. Because the content file is subject to retention requirements like those described previously, the content publishing/retrieving module 108 transmits instructions to the content storage management module 110 that the received content file should be stored in compliant data storage, namely content storage container 114 of object storage service 112. The content storage management module 110 connects to the content storage container 114 and writes the content file as an object to the storage container 114. Because the storage container 114 is WORM-compliant and has key management service encryption enabled, the content file is stored in an encrypted form using a specific encryption key and the content file is stored once with permissions set to read-only. The content file is assigned a timestamp (e.g. mm/dd/yyyy hh:mm:ss) that contains the date and time at which the content file was written to the container 114.

When the content storage management module 110 writes the content file to the content storage container 114, the object storage service 112 generates (202) one or more access logs (AL in FIG. 1) based upon data access requests (e.g. the request to write the content file to container 114) executed on a first compliant data storage container (e.g. container 114) comprising a plurality of files. The access logs can take any of a variety of different forms. In one example, each data access request corresponds to a different log entry in a log file and the corresponding log entry comprises certain data elements associated with the data access request—such as a requester ID (e.g. an identifier, address, device ID, or other type of ID that is used to identify the user and/or the client computing device 102 that initiated the data access request), a container name (e.g. the identifier for the content storage container 114), a request time (e.g. the date/timestamp that the data access request was initiated by client device 102 and/or received by server computing device 106/object storage service 112), a request action (e.g., 'write' the content file), a response status (e.g., 'write' action successful or unsuccessful), and an error code (if needed, to identify a particular problem that occurred when performing the 'write' action). It should be appreciated that the data access log entries can include other types of information (such as container owner ID, a request ID, a request URI, a request key, a number of bytes sent, and the like) and/or be structured in different ways, depending upon the regulatory requirements and/or internal data storage objectives.

Once the access logs are generated in step 202, the object storage service 112 stores (204) the one or more access logs in a non-compliant data storage container (e.g., default access logs container 114). As described above, the default access logs container 116 is considered non-compliant because the container is not WORM-compliant and does not have the required level of encryption enabled. In the embodiment, the default access logs container does not have an object lock enabled and does not use key management service encryption. Therefore, the access logs that are stored in container 116 do not meet the necessary storage and retention requirements. In some embodiments, the object storage service 112 periodically stores the access logs generated from access requests against content storage container 114 in the default access logs container 116—for example, the object storage service 112 can be configured to execute a function that moves and/or copies the access logs to container 116 according to a defined schedule (e.g., every half-hour, every hour, every day, etc.). Typically, the object storage service 112 utilizes a specific account to write the access logs to the default access logs container 116, where the account has certain access control permissions to write data to the container 116.

In order to ensure retention and regulatory compliance for the access logs, the object storage service 112 establishes (206) a second compliant data storage container (e.g. compliant access logs container 118). In certain cloud-based storage implementations, the compliant access logs container 118 is a user-created container that is configured with an object lock enabled (thereby providing WORM compliance) and with key management service encryption enabled (thereby meeting the above-mentioned regulatory requirements). In some embodiments, the compliant access logs container 118 is created at the same time that the content storage container 114 and/or the default access logs container 116 is created. In other embodiments, the compliant access logs container 118 is created after the content storage container 114 and/or the default access logs container 116 is created, but before content files are stored in container 114 or access logs are generated and stored in container 116.

Then, the object storage service 112 retrieves (208), from the non-compliant data storage container (e.g., container 114), the access logs stored therein. In one embodiment, the object storage service 112 is configured to periodically copy or move the access logs from the default access logs container 116 to the compliant access logs container 118 according to a predefined schedule. To accomplish this in certain implementations, the object storage service 112 executes a function (e.g., an anonymous function) that copies log entries from the default access logs container 116 to the compliant access logs container 118, and the function is triggered periodically (e.g. every hour) according to a scheduled event that is defined with proper read/write permissions to read the log entries from the default access log container 116 and write them to the compliant access logs container 118.

Once read from the default access logs container 116, the object storage service 112 stores (210) the access logs in the second compliant data storage container (e.g. compliant access logs container 118). In some embodiments, the object storage service 112 is configured with an account that has requisite permissions to access the container 118 and perform the key management service encryption using a defined key. Because of the settings applied to the container 118, the access logs are stored in the compliant access logs container 118 using a WORM-compliant model (e.g., an object lock is enabled) and with key management service encryption. Thus, storage of the access logs now satisfies the regulatory and retention requirements imposed on the organization and retention of the access logs is synchronized to the underlying content files—thereby enabling efficient monitoring of access activity for security, compliance, and auditing purposes.

Figure 3:
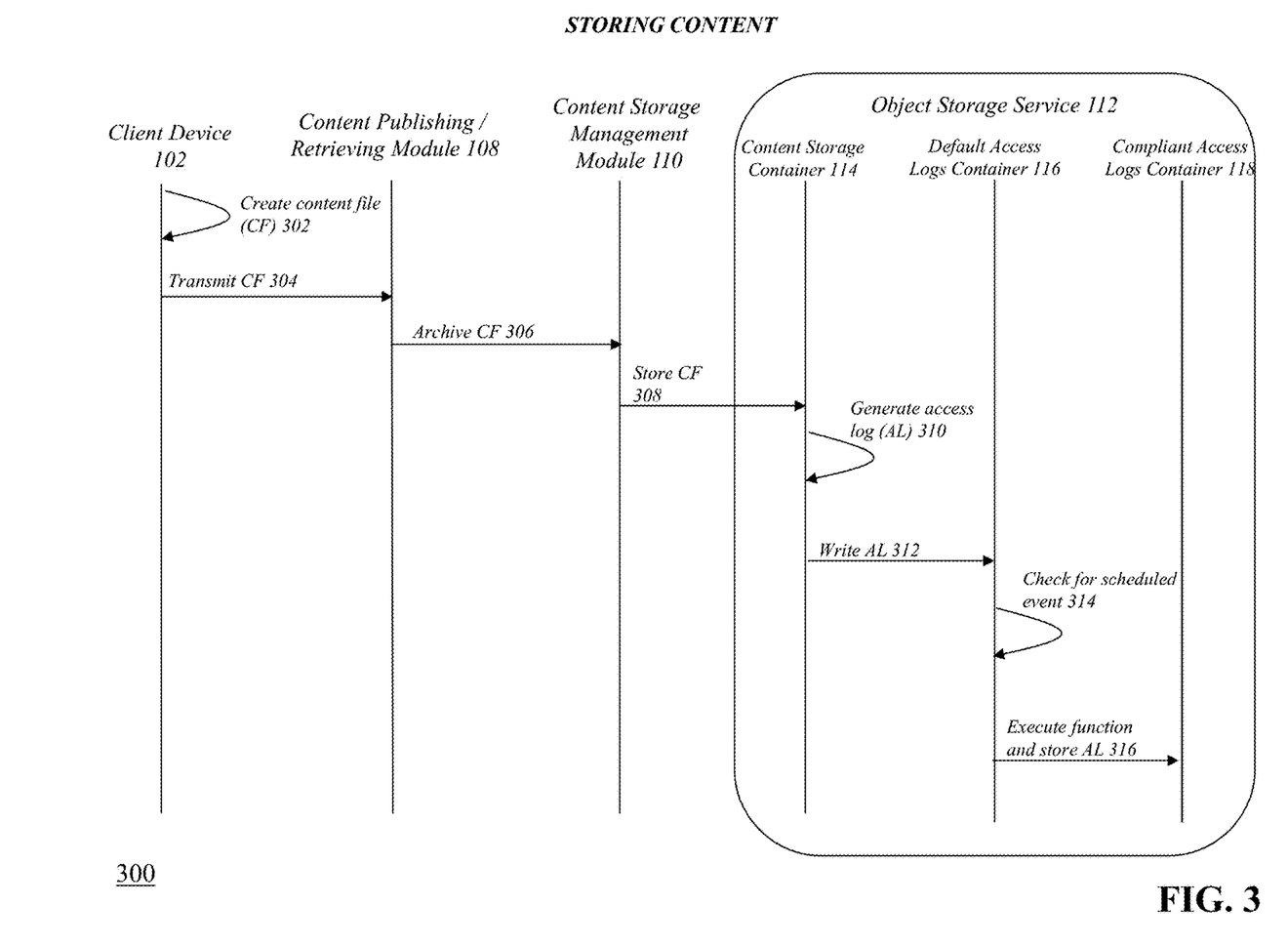
FIG. 3 is a detailed workflow ladder diagram of a use case for secure compliant storage of server access data in a content storage transaction.

FIG. 3 is a detailed workflow ladder diagram 300 of a use case for secure compliant storage of server access data in a content storage transaction, using the system 100 of FIG. 1. A user at client computing device 102 (content author at an organization) creates (step 302) a content file (CF)—an example could be a PDF document with accompanying metadata, where the PDF content comprises policy or procedure information for customer service representatives (CSRs) when interacting with customers. In this instance, due to the nature of the organization's business, they must comply with specific legal and/or regulatory requirements governing the retention and security of these policies and procedures. Therefore, in some embodiments the organization must store each different version of the PDF document using WORM-compliant storage with encryption for a prescribed period of time.

Once the content file is created, the client computing device 102 transmits (step 304) the content file and accompanying metadata to the content publishing/retrieving module 108 of server computing device 106 for archival. The content publishing/retrieving module 108 archives (step 306) the content file and metadata in the object storage service 112 using the content storage management module 110. In some embodiments, the client computing device 102 in conjunction with the content publishing/retrieving module 108, packages the content file and the metadata into a single archive file (e.g., a .zip file) and transmits the packaged archive to the object storage service 112 via the content storage management module 110. For example, the content storage management module 110 can comprise an Axway API Gateway service (available from axway.com) that stores the archive file into a temporary container (not shown) in the object storage service 112. The object storage service 112 executes a function to unpackage the archive file into the content file and metadata, and then stores (step 308) the content file to the content storage container 114 and writes the metadata to a separate data store (not shown). Then, the archive file is deleted from the temporary container. In another example, the content storage management module 110 can simply unpackage the archive file itself and write the content file to container 114 and metadata to a separate data store.

Upon executing the data access action that stores the content file in the content storage container 114, the object storage service 112 generates (step 310) an access log entry and/or access log file that denotes the occurrence of the content file storage action. As described above, the access log entry comprises a plurality of data elements that relate to the characteristics of the storage action (e.g. requester ID, container name, request date/time, request action, response status, error code, container owner ID, a request ID, a request URI, a request key, a number of bytes sent, and so forth.

After generation of the access log, the object storage service 112 writes (step 312) the access log to the default access logs container 116, i.e. the container that is not configured for compliance with the applicable requirements (WORM, key management service encryption). In some embodiments, the object storage service 112 uses an account that is configured with appropriate permissions (e.g. read from container 114, write to container 116) to store the access log data in container 116. As described above, this step 312 can occur at predefined intervals or in real time when data access transactions are performed on container 114.

The object storage service 112 then checks (step 314) to see if a scheduled event for copying of the access log data from container 116 to compliant access logs container 118 is due to be executed. If the scheduled event is due, the object storage service 112 executes the above-referenced anonymous function (i.e. a script) that copies the access logs from container 116 to container 118 (which is WORM compliant via object lock and enabled with key management service encryption) and in some embodiments, deletes the access logs from container 116 once the copying process is complete. At this point, the content data stored in container 114 or the access log data stored in container 118 cannot be modified or deleted (unless a user has very high level permissions) due to the object lock instantiated on the containers. The content data, however, is available for reading from the content storage container 114 as explained with respect to FIG. 4 below.

Figure 4:
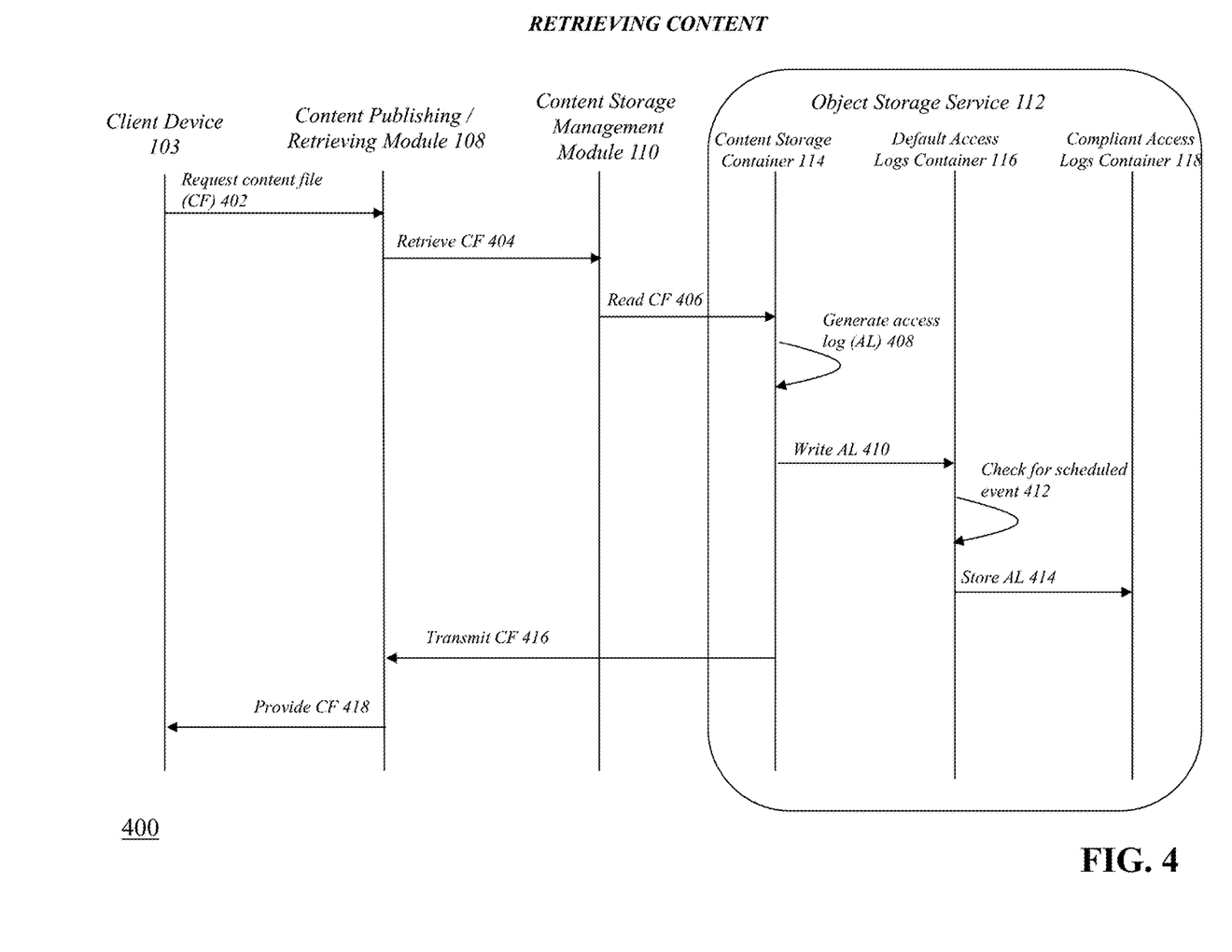
FIG. 4 is a detailed workflow ladder diagram of a use case for secure compliant storage of server access data in a content retrieval transaction.

FIG. 4 is a detailed workflow ladder diagram 400 of a use case for secure compliant storage of server access data in a content retrieval transaction, using the system 100 of FIG. 1. A user at client computing device 103 (a content requester) initiates a request (step 402) for retrieval of a content file from the object storage service 112. Using the above example of FIG. 3, the user at client computing device 103 can be a CSR that is interacting with a customer and needs to refer to specific policies and procedures stored in the service 112. The client computing device 103 issues a request to the content publishing/retrieving module 108 of server computing device 106 to retrieve a specifically-identified content file or files from the object storage service 112.

The content publishing/retrieving module 108 forwards (step 404) the retrieval request to the content storage management module 110, which determines where the content file is stored (e.g. which container the content file can be found). In this example, the content storage management module 110 determines that the content file requested by client device 103 is stored in content storage container 114 and the module 110 transmits (step 406) a request to the object storage service 112 to read the content file from the appropriate container 114.

Upon performing the read transaction, the object storage service 112 generates (step 408) an access log entry and/or access log file that denotes the occurrence of the content file retrieval action. The access log can contain the same or similar data elements as those described above.

After generation of the access log, the object storage service 112 writes (step 410) the access log to the default access logs container 116, i.e. the container that is not configured for compliance with the applicable requirements (WORM, key management service encryption). As described above, this step 410 can occur at predefined intervals or in real time when data access transactions are performed on container 114.

The object storage service 112 then checks (step 412) to see if a scheduled event for copying of the access log data from container 116 to compliant access logs container 118 is due to be executed. If the scheduled event is due, the object storage service 112 executes the above-referenced anonymous function (i.e. a script) that copies (step 414) the access logs from container 116 to container 118 (which is WORM compliant via object lock and enabled with key management service encryption) and in some embodiments, deletes the access logs from container 116 once the copying process is complete. At this point, the content data stored in container 114 or the access log data stored in container 118 cannot be modified or deleted (unless a user has very high level permissions) due to the object lock instantiated on the containers. The content data, however, is available for reading from the content storage container 114 to that the request from client device 103 can be satisfied.

The object storage service 112 retrieves the content file from the content storage container 114 and transmits (step 416) the content file to the content publishing/retrieving module 108, which in turn provides the content file to the client device 103 for e.g. display and interaction with the content requester.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for secure compliant storage of server access data in a cloud platform storage environment, the system comprising a server computing device having a memory for storing computer-executable instructions and a processor that executes the computer-executable instructions to:

generate one or more access logs based upon data access requests executed on a first cloud-based compliant data storage container in a first region of the cloud platform storage environment, wherein the first cloud-based compliant data storage container comprises a plurality of files and is coupled to a cloud-based non-compliant data storage container in the first region;

store the one or more access logs in the cloud-based non-compliant data storage container;

establish a second cloud-based compliant data storage container in a second region of the cloud platform storage environment, the second cloud-based compliant data storage container configured to (i) store access logs encrypted using a platform-managed key provided from a key management service, (ii) retain the stored access logs for a prescribed period of time, and (iii) prevent changes to the stored access logs using an object lock applied to the second cloud-based compliant data storage container;

retrieve, from the cloud-based non-compliant data storage container, the access logs stored therein;

encrypt the retrieved access logs using the platform-managed key provided from the key management service; and store the encrypted access logs in the second cloud-based compliant data storage container.

2. The system of claim 1, wherein the first compliant data storage container (i) has an object lock applied to prevent changes to the plurality of files and (ii) stores the plurality of files as encrypted files using the platform-managed key provided from the key management service.

3. The system of claim 2, wherein the cloud-based non-compliant data storage container comprises a container without an object lock applied to prevent changes to the stored access logs and without storing access logs encrypted using the platform-managed key provided from the key management service.

4. The system of claim 1, wherein the one or more access logs comprise attributes of requests to access one or more of the files stored in the first cloud-based compliant data storage container.

5. The system of claim 4, wherein the attributes of requests to access one or more of the files comprise a requester ID, a container name, a request time, a request action, a response status, and an error code.

6. The system of claim 1, wherein the server computing device executes a function to retrieve the access logs from the cloud-based non-compliant data storage container, encrypt the stored access logs using the platform-managed key provided from the key management service, and store the encrypted access logs in the second cloud-based compliant data storage container.

7. The system of claim 6, wherein the server computing device automatically executes the function according to a predefined schedule.

8. The system of claim 7, wherein the predefined schedule includes periodic events that, when triggered, cause the server computing device to execute the function.

9. The system of claim 8, wherein each periodic event is configured according to one or more permissions that enable the server computing device to read the access logs from the cloud-based non-compliant data storage container, encrypt the access logs using the platform-managed key provided from the key management service, and write the encrypted access logs to the second cloud-based compliant data storage container.

10. The system of claim 1, wherein establishing the second cloud-based compliant data storage container comprises creating a new data storage container in the second region of the cloud platform storage environment and configuring the new data storage container to match a data storage compliance configuration of the first cloud-based compliant data storage container.

11. The system of claim 10, wherein the data storage compliance configuration of the first cloud-based compliant data storage container comprises (i) an object lock applied to prevent changes to the stored plurality of files and (ii) enabling storage of files encrypted using the platform-managed key provided from the key management service.

12. The system of claim 1, wherein the server computing device deletes the access logs from the cloud-based non-compliant data storage container after storing the encrypted access logs in the second cloud-based compliant data storage container.

13. A computerized method of secure compliant storage of server access data in a cloud platform storage environment, the method comprising:

generating, by a server computing device, one or more access logs based upon data access requests executed on a first cloud-based compliant data storage container in a first region of the cloud platform storage environment, wherein the first cloud-based compliant data storage container comprises a plurality of files and is coupled to a cloud-based non-compliant data storage container in the first region;

storing, by the server computing device, the one or more access logs in the non-compliant cloud-based data storage container;

establishing, by the server computing device, a second cloud-based compliant data storage container in a second region of the cloud platform storage environment, the second cloud-based compliant data storage container configured to (i) store access logs encrypted using a platform-managed key provided from a key management service, (ii) retain the stored access logs for a prescribed period of time, and (iii) prevent changes to the stored access logs using an object lock applied to the second cloud-based compliant data storage container;

retrieving, by the server computing device from the cloud-based non-compliant data storage container, the access logs stored therein;

encrypting, by the server computing device, the retrieved access logs using the platform-managed key provided from the key management service; and storing, by the server computing device, the data access logs in the second cloud-based compliant data storage container.

14. The method of claim 13, wherein the first cloud-based compliant data storage container (i) has an object lock applied to prevent changes to the plurality of files and (ii) stores the plurality of files as encrypted files using the platform-managed key provided from the key management service.

15. The method of claim 14, wherein the cloud-based non-compliant data storage container comprises a container without an object lock applied to prevent changes to the stored access logs and without storing access logs encrypted using the platform-managed key provided from the key management service.

16. The method of claim 13, wherein the one or more access logs comprise attributes of requests to access one or more of the files stored in the first cloud-based compliant data storage container.

17. The method of claim 16, wherein the attributes of requests to access one or more of the files comprise a requester ID, a container name, a request time, a request action, a response status, and an error code.

18. The method of claim 13, wherein the server computing device executes a function to retrieve the data access logs from the cloud-based non-compliant data storage container, encrypt the retrieved data access logs using the platform-managed key provided from the key management service, and store the encrypted data access logs in the second cloud-based compliant data storage container.

19. The method of claim 18, wherein the server computing device automatically executes the function according to a predefined schedule.

20. The method of claim 19, wherein the predefined schedule includes periodic events that, when triggered, cause the server computing device to execute the function.

21. The method of claim 20, wherein each periodic event is configured according to one or more permissions that enable the server computing device to read the access logs from the cloud-based non-compliant data storage container, encrypt the access logs using the platform-managed key provided from the key management service, and write the encrypted access logs to the second cloud-based compliant data storage container.

22. The method of claim 13, wherein establishing the second cloud-based compliant data storage container comprises creating a new data storage container in the second region of the cloud platform storage environment and configuring the new data storage container to match a data storage compliance configuration of the first cloud-based compliant data storage container.

23. The method of claim 22, wherein the data storage compliance configuration of the first cloud-based compliant data storage container comprises (i) an object lock applied to prevent changes to the stored plurality of files and (ii) enabling storage of files encrypted using the platform-managed key provided from the key management service.

24. The method of claim 13, wherein the server computing device deletes the access logs from the cloud-based non-compliant data storage container after storing the encrypted access logs in the second cloud-based compliant data storage container.

\* \* \* \* \*